Figure 1:
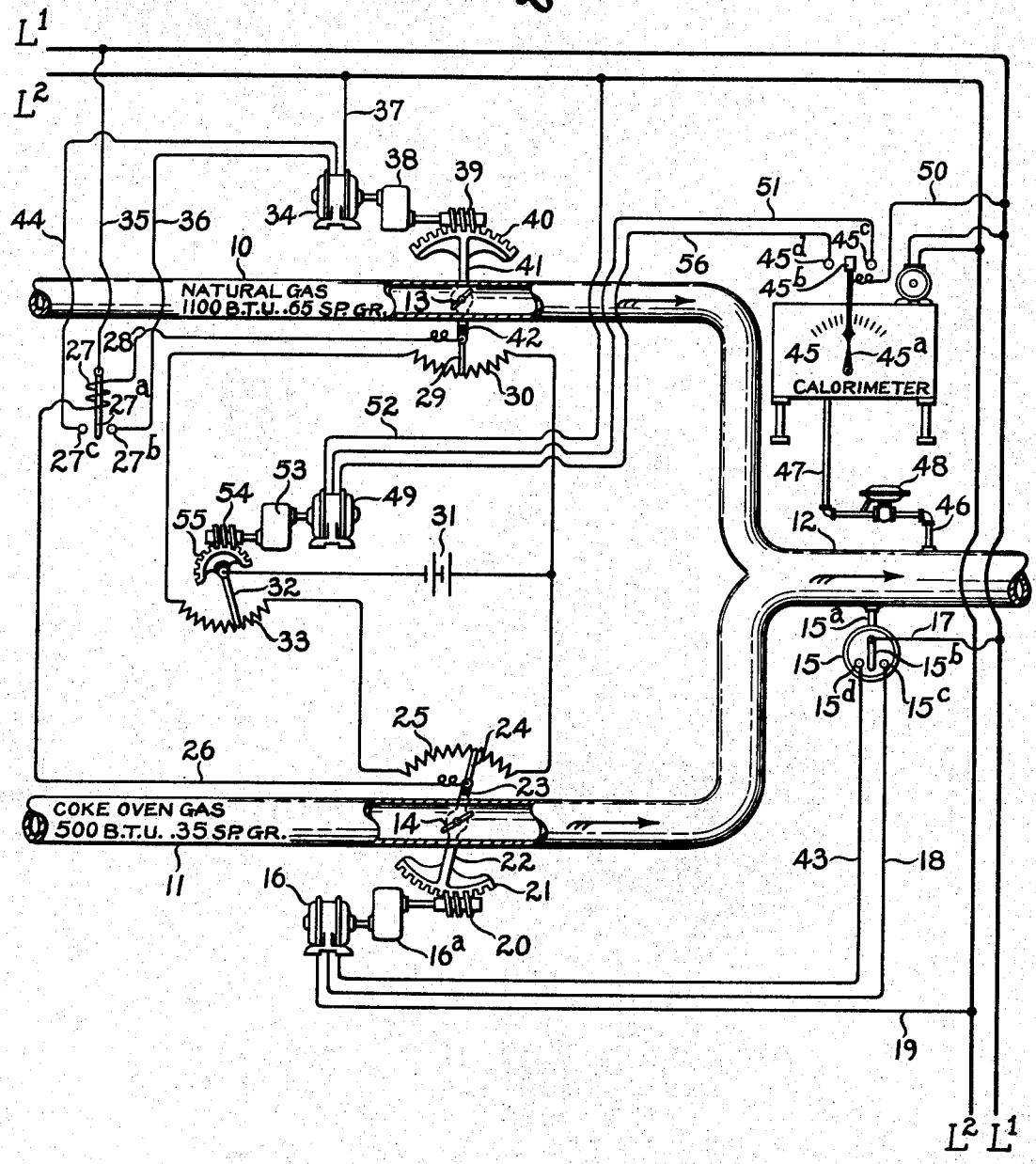

March 2, 1937. E. X. SCHMIDT 2,072,384
METHOD OF AND APPARATUS FOR PROPORTIONING COMBUSTIBLE FLUIDS
Filed Dec. 1, 1933 3 Sheets-Sheet 1

Inventor
Edwin X. Schmidt
By Frank H. Hubbard
Attorney

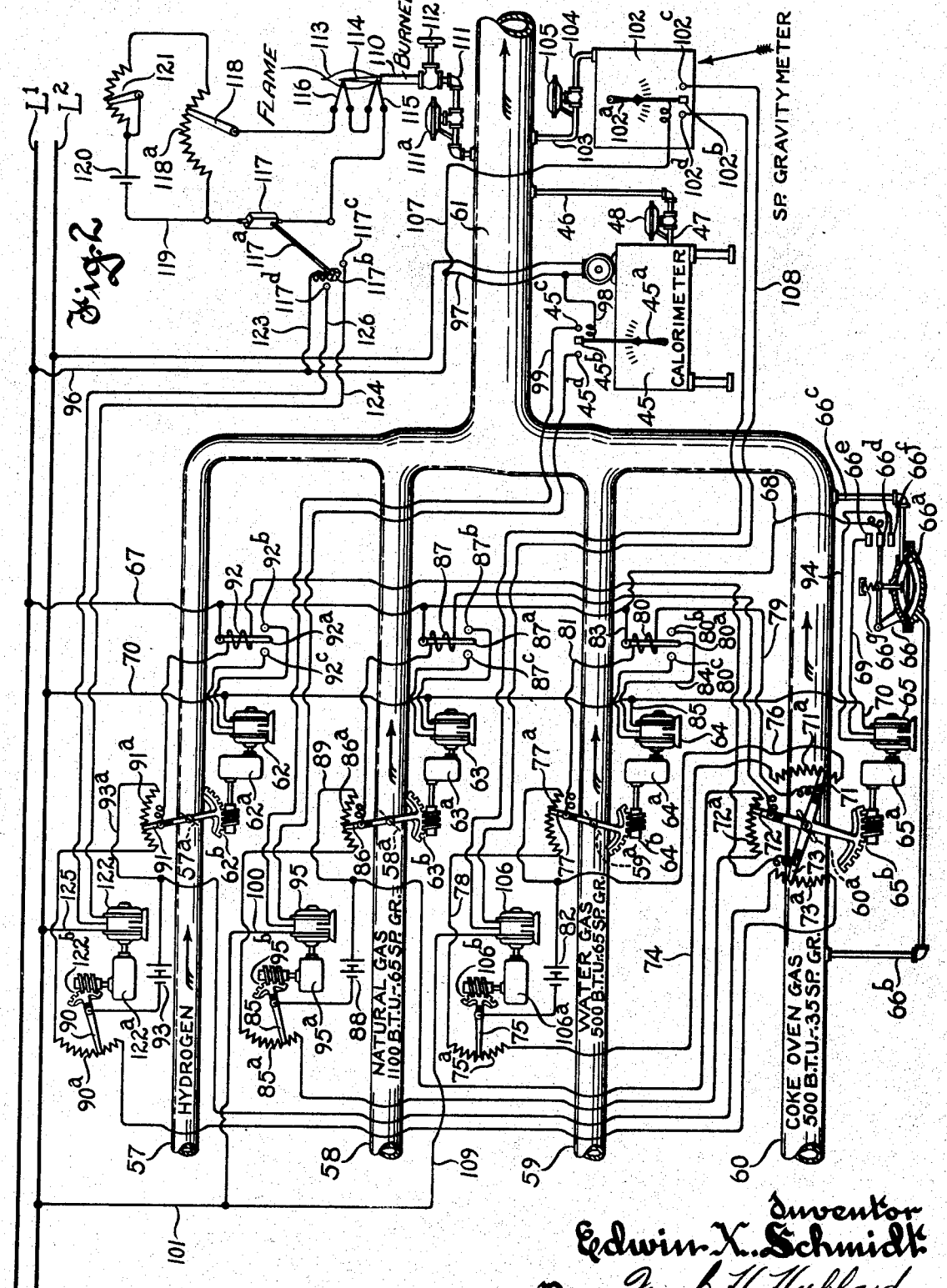

March 2, 1937.　　　　E. X. SCHMIDT　　　　2,072,384
METHOD OF AND APPARATUS FOR PROPORTIONING COMBUSTIBLE FLUIDS
Filed Dec. 1, 1933　　　3 Sheets-Sheet 3
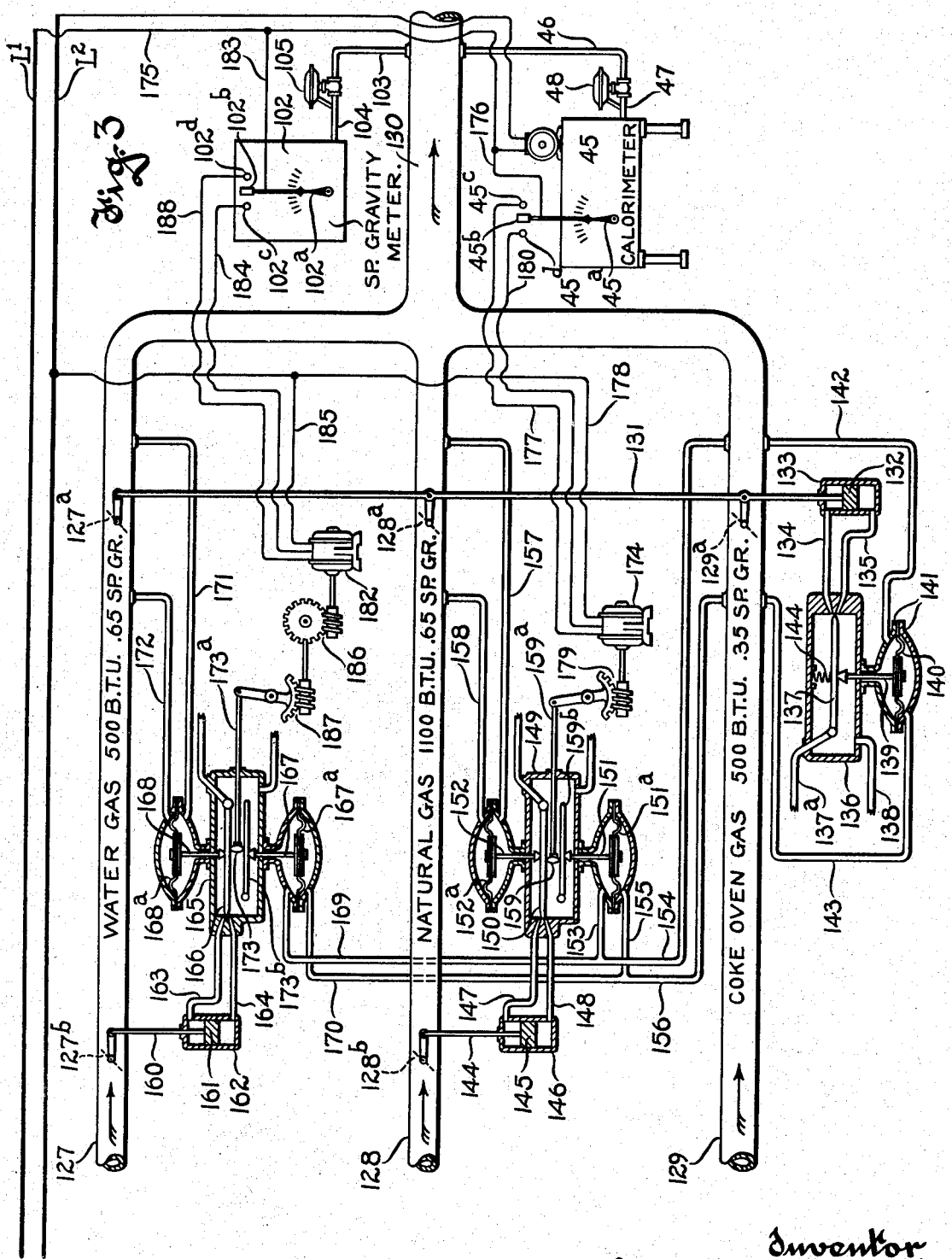
Inventor
Edwin X. Schmidt
By Frank H. Hubbard
Attorney Patented Mar. 2, 1937

2,072,384

UNITED STATES PATENT OFFICE 2,072,384

METHOD OF AND APPARATUS FOR PROPORTIONING COMBUSTIBLE FLUIDS

Edwin X. Schmidt, Whitefish Bay, Wis., assignor to Cutler-Hammer, Inc., Milwaukee, Wis., a corporation of Delaware Application December 1, 1933, Serial No. 700,549

15 Claims. (Cl. 48—180)

This invention relates to improvements in methods of and apparatus for proportioning combustible fluids.

An object of the invention is to provide novel methods of and apparatus for jointly and/or individually varying the volumetric rates of flow of a plurality of constituent combustible fluid flows having unlike qualities or characteristics to rapidly and accurately compensate for variations in the qualities or characteristics of the mixture thereof.

Another object is to provide novel methods of and apparatus for jointly varying the volumetric rates of a plurality of constituent combustible fluid flows to maintain substantially constant certain characteristics of the composite flow and to independently vary the volumetric rates of certain of said constituent combustible fluid flows to maintain substantially constant another characteristic or characteristics of the composite flow.

Another object is to provide novel methods of and apparatus for volumetrically proportioning a multiplicity of combustible fluids having widely different and variable characteristics to provide a combustible mixture thereof wherein all of said characteristics are maintained at substantially constant predetermined values.

Another object is to provide novel methods of and apparatus for gas mixing control wherein and whereby a multiplicity of streams of gas having certain like and certain unlike or variable characteristics are so proportioned automatically as to provide a gaseous mixture wherein all of said characteristics are maintained at substantially constant predetermined values.

Another and more specific object is to provide novel electrical and/or mechanical means operable to accomplish the desirable results aforementioned.

Other objects and advantages of the invention will hereinafter appear.

The accompanying drawings illustrate certain embodiments of the invention which will now be described, it being understood that the embodiments illustrated are susceptible of modification in certain details of construction and operation thereof without departing from the scope of the appended claims.

In the drawings, Figure 1 is a schematic and diagrammatic illustration of apparatus for proportioning combustible fluids, the main and branch conduits being shown in elevation, with portions of the latter broken away.

Fig. 2 is a schematic and diagrammatic illustration of apparatus for jointly and/or independently varying the volumetric rates of a multiplicity of combustible fluid flows to maintain substantially constant a number of different characteristics of the composite flow or mixture, the main and branch conduits being shown in elevation, and a portion of the pressure responsive switch being shown in section, and Fig. 3 is a schematic and diagrammatic illustration of apparatus quite similar in function to the apparatus shown in Figs. 1 and 2, respectively, but having mechanical means substituted for the electrically operated primary or initial proportioning means of the aforementioned figures,—the main and branch conduits being shown in elevation, and certain other parts of the system being shown in section.

Referring first to Fig. 1, the numeral 10 designates a conduit through which a rich gas (such as natural gas) is adapted to flow in the direction indicated by the arrow, and 11 designates a relatively larger conduit through which a lean gas (such as coke oven gas or water gas) is adapted to flow in the direction indicated by the arrow,—said conduits 10 and 11 being adapted to discharge into a conduit 12 in which the rich and lean gases are mixed and through which the mixture flows to the desired point or points of use or storage. It may be assumed that the lean gas flowing in conduit 11, whether coke oven gas or water gas, has a total heating value of from 500 to 550 B. t. u. per cubic foot, and it may be further assumed that a total heating value of 800 B. t. u. per cubic foot is desired for the mixture flowing through conduit 12. The total heating value of the natural gas flowing in conduit 10 will be about 1100 B. t. u. per cubic foot.

An adjustable valve 13 is provided in conduit 10 and an adjustable valve 14 is provided in conduit 11, said valves being initially adjusted to so proportion the volumetric rates of said constituent flows as to provide a mixture in conduit 12 of predetermined total heating value, say 800 B. t. u. per cubic foot. It is necessary to vary the volumetric rate of flow of the fluid mixture through conduit 12 to compensate for variations in demand therefor. Accordingly I provide means for effecting substantially simultaneous adjustments of the valves 13 and 14 to vary the volumetric rate of flow of the fluid mixture through conduit 12 as required, while maintaining substantially constant the aforementioned volumetric proportionality between the rates of flow of the constituent fluids through conduits 10 and 11 respectively.

Said means as shown may comprise a well known form of pressure-responsive switch designated by the numeral 15,—the same being connected by pipe 15ª to conduit 12 to be subjected to pressure conditions within the latter. Said switch may be adjusted in a known manner to provide for maintenance of the contactor 15ᵇ in an intermediate or neutral position, as illustrated, so long as the pressure of fluid within conduit 12 remains at the preselected value. However, assuming an increase in the rate of demand for the fluid mixture the pressure of fluid in conduit 12 will drop, with consequent movement of contactor 15ᵇ into engagement with a stationary contact 15ᶜ,—thus completing an energizing circuit for a motor 16 of the split-field reversible type. Said circuit may be traced from line $L^1$ of a suitable source of electric current by conductor 17, contactor 15ᵇ and contact 15ᶜ, conductor 18 through one of the field windings of motor 16 and by conductor 19 to line $L^2$.

Motor 16 is adapted, through suitable speed reducing gearing 16ª, to drive a worm 20 which meshes with a gear segment 21 carried by one arm 22 of the actuating lever attached to valve 14. The other arm 23 of said lever carries, in insulated relation thereto, a rheostat contactor 24 which cooperatively engages the resistor 25. Contactor 24 is connected by conductor 26 with one terminal of the operating coil 27 of a polarized relay having a movable contactor 27ª and oppositely arranged stationary contacts 27ᵇ and 27ᶜ. The other terminal of the coil 27 is connected by conductor 28 with the contactor 29 of a second rheostat, the resistor of which is designated by the numeral 30. Said rheostats 25 and 30 and said relay coil 27 are arranged in the form of a Wheatstone bridge, the bridge circuit being supplied with direct current from any suitable source, as, for instance, the battery 31. One terminal of battery 31 is connected to the bridge circuit through the contactor 32 of a third rheostat the resistor of which is designated by the numeral 33,—said resistor 33 being connected at its respective ends with the left-hand terminals of resistors 25 and 30.

Thus it may be assumed that with the three rheostat contactors 24, 29 and 32 in the positions thereof illustrated the Wheatstone bridge circuit will be balanced,—thus permitting the polarized relay contactor 27ª to remain in the neutral position thereof illustrated. However, upon operation of motor 16 to effect opening of valve 14 in the manner aforedescribed, the contactor 24 will be correspondingly moved toward the right, thus unbalancing the bridge circuit, with a consequent flow of current through coil 27 in a direction to effect engagement of the relay contactor 27ª with, say, contactor 27ᵇ. This completes an energizing circuit for a second motor 34 of the split-field reversible type; said circuit extending from line $L^1$ by conductor 35 through relay contactor 27ª, and contact 27ᵇ, by conductor 36 through one of the field windings of motor 34, and by conductor 37 to line $L^2$.

Motor 34 is connected, through suitable speed reducing gearing 38, with a worm 39 which meshes with the gear segment 40 carried by one arm 41 of the actuating lever for valve 13. Under the conditions assumed the motor 34 will be operated in a direction to effect opening movement of valve 13,—it being noted that rheostat contactor 29 is carried by but insulated from the other arm 42 of said actuating lever, wherefore said contactor 29 is correspondingly moved toward the right to effect a re-balancing of the bridge circuit. By the means aforedescribed the motors 16 and 34 will be operated substantially simultaneously in directions to effect opening of their respectively associated valves 14 and 13 until the desired or required pressure conditions are restored in conduit 12, whereupon the contactor 15ᵇ of pressure switch 15 will be disengaged from contact 15ᶜ to effect interruption of the aforedescribed energizing circuit of motor 16.

At the same time the aforedescribed operation of rheostat contactor 29 by motor 34 will effect re-balancing of the bridge circuit, with consequent de-energization of the polarized relay coil 27 and movement of contactor 27ª out of engagement with contact 27ᵇ to interrupt the aforedescribed energizing circuit of motor 34. Due to the simultaneous and proportional movement of valves 14 and 13 the volumetric proportionality of the constituent fluid flows through conduits 11 and 10 is maintained substantially constant under conditions of variation in said rates of flow jointly to compensate for variations in the rate of demand for the mixture.

The manner of operation of the aforedescribed parts in the event of a decrease in the rate of demand for the mixture will be readily understood from the foregoing description. Under the conditions last mentioned the contactor 15ᵇ of pressure switch 15 will be engaged with contact 15ᵈ, thus completing an energizing circuit for motor 16 which may be traced from line $L^1$ by conductor 17 through said contactor 15ᵇ and contact 15ᵈ, by conductor 43 through the other field winding of motor 16, and by conductor 19 to line $L^2$. Motor 16 is thus operated in a reverse direction to effect a gradual closing movement of valve 14,—the contactor 24 being simultaneously moved toward the left across rheostat resistor 25 to unbalance the Wheatstone bridge circuit in a sense opposite to that aforedescribed. Consequently current will flow through the polarized relay coil 27 in a direction to cause engagement of the relay contactor 27ª with contact 27ᶜ.

A reverse circuit is thus provided for motor 34, said circuit extending from line $L^1$ by conductor 35 through said relay contactor 27ª and contact 27ᶜ, by conductor 44 through the other field winding of motor 34, and by conductor 37 to line $L^2$. Motors 16 and 34 will be operated in the reverse directions thereof last described pending restoration of the desired or required pressure conditions in conduit 12,—the circuit of motor 16 being then interrupted due to disengagement of the pressure switch contactor 15ᵇ from the contact 15ᵈ, and the circuit of motor 34 being interrupted through disengagement of the polarized relay contactor 27ª from contact 27ᶜ due to re-balancing of the Wheatstone bridge circuit.

In practice it is found that either or both of the constituent fluids flowing in conduits 10 and 11 will be subject to relatively wide variations in respect of the instantaneous total heating value per unit volume thereof, and such variations, unless compensated for, will necessarily result in corresponding variations in the total heating value per unit volume of the mixture flowing in conduit 12.

Due to the fact that the constituent fluids flowing in conduits 10 and 11 are of substantially different quality with respect to each other, it will be apparent that an increase in the instantaneous total heating value per unit volume of the mixture flowing in conduit 12 with respect to a preselected value may be compensated for or corrected by decreasing the volumetric rate of flow of the rich gas constituent flowing in conduit 10 or by increasing the volumetric rate of flow of the lean gas constituent flowing in conduit 11, or both. Similarly a decrease in the instantaneous total heating value per unit volume of the mixture in conduit 12 with respect to said predetermined value may be compensated for or corrected by increasing the volumetric rate of flow of the rich gas or by decreasing the volumetric rate of flow of the lean gas, or both.

In accordance with my invention it is preferred to vary only the volumetric rate of flow of the rich gas in conduit 10 to compensate for any and all variations in the instantaneous total heating value per unit volume of the mixture, since only a relatively small variation in the volumetric rate of flow of the rich gas will be required to compensate for any given variation in the instantaneous total heating value per unit volume of the mixture.

This arrangement is desirable for several reasons. For instance, it minimizes variations in the volumetric rate of flow of the mixture through conduit 12 as an incident to variations in said total heating value per unit volume thereof. Moreover, the calorimeter device employed is naturally more rapidly responsive to variations in the rate of flow of the rich gas constituent of the mixture than to a corresponding variation in the volumetric rate of flow of the lean gas constituent.

Accordingly I employ a precision type calorimeter which is herein shown diagrammatically and designated by the reference numeral 45. Said calorimeter may be of the character described and claimed in the Packard Patent No. 1,625,277, dated April 19, 1927, or the same may be of the quick-acting type described and claimed in my co-pending application Serial No. 540,863, filed May 29, 1931. A continuous sample of the gas mixture flowing in conduit 12 is withdrawn by or supplied to the calorimeter 45 through piping 46, 47; suitable means such as the pressure-regulating valve 48 being provided to insure maintenance of the sample at a predetermined relatively low and substantially constant pressure.

The calorimeter acts in a well known manner to ascertain and indicate the total heating value per unit volume of the mixture flowing through conduit 12,—the indicator being shown diagrammatically at 45$^a$, and the same having associated therewith and movable thereby a contactor 45$^b$. Contactor 45$^b$ is arranged to provide for intermediate or neutral positioning thereof as illustrated so long as the total heating value per unit volume of the mixture remains constant at a value preselected therefor.

Upon an increase in said total heating value per unit volume contactor 45$^a$ is automatically moved into engagement with a cooperating stationary contact, say, contact 45$^c$, thus completing an energizing circuit for a third motor 49 of the split-field reversing type; said circuit extending from line L$^1$ by conductor 50 through contactor 45$^b$ and contact 45$^c$, by conductor 51 through one of the field windings of motor 49 and by conductor 52 to line L$^2$. Motor 49 is adapted, through suitable speed reducing gearing 53, to drive the worm 54 which meshes with a gear segment 55 carried by the rheostat contactor 32.

Under the conditions last mentioned it may be assumed that motor 49 is operated in a direction to effect gradual movement of contactor 32 toward the left over resistor 33, thus unbalancing the bridge circuit in a sense which will cause engagement of the polarized relay contactor 27$^a$ with contact 27$^c$, with resultant operation of motor 34 in a direction to effect gradual closing movement of valve 13. This decreases the volumetric ratio of the rich gas flow through conduit 10 with respect to the lean gas flow through conduit 11, wherefore the total heating value per unit volume of the mixture flowing through conduit 12 is reduced.

When the valve 13 has been closed to a degree sufficient to restore the preselected total heating value per unit volume of the mixture flowing in conduit 12, the contactor 45$^b$ will be moved automatically to the neutral position illustrated, thus interrupting the aforedescribed circuit of motor 49 to prevent any further unbalancing of the bridge circuit, and the aforedescribed operation of motor 34 for closing valve 13 will be interrupted through disengagement of relay contactor 27$^a$ from contact 27$^c$ due to balancing of the bridge circuit. As aforeindicated the calorimeter 45 is shown more or less diagrammatically, and it is to be understood that in practice the contactor 45$^b$ and contact 45$^c$ (or contacts in series therewith) will preferably be engaged and disengaged intermittently to effect closing movement of valve 13 in steps, whereby over-adjustment and/or "hunting" of the control elements is effectively prevented.

In the event that the total heating value per unit volume of the mixture in conduit 12 falls below the value preselected therefor, the calorimeter contactor 45$^b$ will be engaged with contact 45$^d$, thus completing a reverse circuit for motor 49, which circuit may be traced from line L$^1$ by conductor 50 through contactor 45$^b$ and contact 45$^d$, by conductor 56 through the other field winding of motor 49, and by conductor 52 to line L$^2$. Motor 49 thereupon operates to effect gradual movement of rheostat contactor 32 toward the right to correspondingly unbalance the bridge circuit in a sense opposite to that last described. Thereupon the relay contactor 27$^a$ is engaged with contact 27$^b$ to complete the aforedescribed alternative energizing circuit of motor 34 to effect gradual opening movement of valve 13.

The resulting increase in the volumetric rate of flow of the rich gas will restore the total heating value per unit volume preselected for said mixture, whereupon the calorimeter contactor 45$^b$ will be disengaged from contact 45$^d$, with consequent substantially simultaneous interruption of operation of motors 49 and 34 as aforedescribed.

The control elements aforedescribed thus operate in a simple and efficient manner to maintain substantially constant the total heating value per unit volume of the mixture in conduit 12 under conditions of variation in the volumetric rate of flow of said mixture due to variations in the demand therefor, and under conditions of variation in the total heating value per unit volume of either or both of the constituent combustible fluid flows in conduits 10 and 11.

In the gas mixing control system illustrated in Fig. 2 I prefer to employ a multiplicity of branch conduits 57, 58, 59 and 60 through which different combustible gaseous fluids are adapted to flow, said branch conduits being adapted to discharge into a conduit 61 in which the constituent gases are mixed and through which the mixture is conveyed to a point or points of use or storage. In practice the conduits 58 and 59 may be of substantially the same size or diameter, whereas conduit 57 is preferably of substantially smaller size and conduit 60 is of substantially larger size than said conduits 58 and 59. I prefer to supply through conduit 57 a continuous stream of hydrogen,—the volumetric rate of flow of said hydrogen being varied in the manner hereinafter described to compensate for certain variations in the flame characteristics of the gaseous mixture, such as flame temperature, flame length and/or velocity of flame propagation.

I prefer to supply through conduit 58 a continuous stream of natural gas,—the same having a relatively high total heating value per unit volume, say, 1100 B. t. u. per cubic foot, and a specific gravity of approximately .65. Water gas is supplied through conduit 59,—the same having a relatively low total heating value per unit volume, say, 500 B. t. u. per cubic foot, and a specific gravity of .65, that is, substantially the same as the specific gravity of the natural gas. Coke oven gas is supplied through conduit 60,—the same having a total heating value per unit volume substantially equal to that of the water gas, say, 500 B. t. u. per cubic foot, and a specific gravity of .35, which is much lower than the specific gravity of the water gas.

Said conduits 57 to 60 are respectively provided with valves shown in dotted lines at $57^a$, $58^a$, $59^a$, and $60^a$; and said valves are initially adjusted in any suitable manner, depending upon the instantaneous values of the various characteristics of the constituent fluids, to provide a flowing mixture in conduit 61 having approximately the ideal or desired characteristics; namely, a preselected or desired total heating value per unit volume; a preselected or desired specific gravity; preselected or desired characteristics of flame temperature, flame length and/or velocity of flame propagation; and a preselected or desired volumetric rate of flow of the mixture to satisfy the instantaneous rate of demand therefor.

The valves $57^a$, $58^a$, $59^a$, and $60^a$ are adapted to be driven individually by split-field reversible electric motors 62 to 65, respectively, through the medium of reducing gears designated by the numerals $62^a$, $63^a$, $64^a$, and $65^a$, and worm and pinion gearing designated by the numerals $62^b$, $63^b$, $64^b$, and $65^b$. If the aforementioned desired or preselected characteristics of the fluid mixture, and the rate of demand therefor, remain constant the proportioning and controlling elements now to be described will be unaffected and the several valves $57^a$ to $60^a$, inclusive, will remain in the positions thereof to which they were initially adjusted.

As will be understood, of course, when the rate of demand for the fluid mixture increases or decreases it is desired that the volumetric rates of flow of the constituent fluids shall be varied substantially simultaneously and in a manner to maintain the predetermined proportionality therebetween, whereby any unnecessary variation in the values of the aforementioned characteristics of the mixture is avoided.

For accomplishment of this desirable result I utilize the valve $60^a$ in conduit 60 as a sort of "master" valve; the same having associated therewith a well known form of pressure responsive switch designated in general by the numeral 66, the same comprising a flexible member or diaphragm $66^a$ the lower surface of which is subjected, through piping $66^b$, to pressure conditions on the upstream side of valve $60^a$ and the upper surface of which is subjected, through piping $66^c$, to pressure conditions on the downstream side of said valve (or, in other words, to the pressure conditions within conduit 61).

Said switch is provided with a movable contactor $66^d$ and upper and lower stationary contacts $66^e$ and $66^f$. Switch 66 is thus adapted to control the operating motor of valve $60^a$ in a manner to maintain a predetermined pressure drop across the latter,—said switch 66 having means, such as the adjustable spring $66^g$, whereby the value of said pressure drop may be varied at will.

In operation, upon an increase in the demand for the fluid mixture, the pressure at the downstream side of valve $60^a$ will decrease thus increasing the pressure drop across the latter. Consequently the diaphragm $66^a$ will be moved upwardly and the contactor $66^d$ controlled thereby will engage contact $66^e$, thus completing an energizing circuit for motor 65,—which circuit may be traced from line $L^1$ by conductors 67 and 68 through said contactor $66^d$ and contact $66^e$, by conductor 69 through one of the field windings of motor 65, and by conductor 70 to line $L^2$.

Under these conditions motor 65 operates, through gearing $65^a$, $65^b$, to effect opening movement of valve $60^a$, whereby the volumetric rate of flow of coke oven gas through conduit 60 is gradually increased. Associated with valve $60^a$ and operable in a direction and to a degree corresponding to the movement thereof are three rheostat contactors 71, 72 and 73,—said contactors being respectively cooperable with resistors $71^a$, $72^a$, and $73^a$.

One terminal of resistor $71^a$ is connected by conductor 74 with one terminal of a resistor $75^a$ with which the contactor 75 is adapted to cooperate,—the other terminal of resistor $71^a$ being connected by conductor 76 with one terminal of a resistor $77^a$ with which the contactor 77 is adapted to cooperate, the other terminals of resistors $75^a$ and $77^a$ being connected by conductor 78. Contactor 71 is connected by conductor 79 with one terminal of the coil 80 of a polarized relay,—the other terminal of said coil being connected by conductor 81 with contactor 77.

As will be understood the resistors $71^a$, $75^a$, $77^a$ and their associated contactors and coil 80 are connected in the form of a Wheatstone bridge circuit,—a battery 82 or other suitable source of direct current energy supply being interposed between contactor 75 and conductor 76. Said polarized relay is provided with a movable contactor $80^a$ and opposed stationary contacts $80^b$ and $80^c$.

Assuming said Wheatstone bridge circuit to have been initially balanced, it will be apparent that during the aforedescribed opening movement of valve $60^a$ the contactor 71 will be simultaneously moved downwardly over resistor $71^a$ to effect unbalancing of the bridge circuit. As a result the polarized relay contactor $80^a$ will be moved into engagement with one of the stationary contacts, say, contact $80^b$, thus completing an energizing circuit for motor 64,—which circuit may be traced from line $L^1$ by conductors 67 and 83 through said contactor $80^a$ and contact $80^b$, by conductor 84 through one of the windings of motor 64, and by conductors 85 and 70 to line $L^2$. Motor 64 thus acts, through gearing $64^a$, $64^b$, to effect gradual opening movement of valve $59^a$,—the contactor 77 moving along with valve $59^a$ and cooperating with resistor $77^a$ to gradually effect re-balancing of the bridge.

In like manner the resistor $72^a$ and contactor 72 have associated therewith in the form of a Wheatstone bridge circuit the resistor $85^a$ and contactor 85, the resistor 86ª and contactor 86, and the polarized relay coil 87,—the latter having associated therewith the movable contactor 87ª and stationary contacts 87ᵇ, 87ᶜ, and a battery 88 being connected between contactor 85 and a conductor 89 as described in connection with the first mentioned bridge circuit. Contactor 87ª of the polarized relay will engage contact 87ᵇ thus completing an obvious circuit for motor 63 whereby the latter is operated to effect, through gearing 63ª, 63ᵇ, opening movement of valve 58ª to a degree corresponding with the degree of opening movement of valve 60ª.

So also the resistor 73ª and contactor 73 have associated therewith in the form of a Wheatstone bridge circuit the resistor 90ª and contactor 90, the resistor 91ª and contactor 91, and the polarized relay coil 92,—the latter having associated therewith the movable contactor 92ª and stationary contacts 92ᵇ, 92ᶜ, and a battery 93 being connected between contactor 90 and a conductor 93ª as described in connection with the first mentioned bridge circuit. Contactor 92ª of the polarized relay will engage contact 92ᵇ thus completing an obvious circuit for motor 62 whereby the latter is operated to effect, through gearing 62ª, 62ᵇ, opening movement of valve 57ª to a degree corresponding with the degree of opening movement of valve 60ª.

The means aforedescribed thus provides for substantially simultaneous opening movement of all of the valves 60ª, 59ª, 58ª, and 57ª to like degrees to increase the volumetric rate of flow of the mixture through conduit 61 to satisfy the increased demand for the mixture. Inasmuch as the relative volumetric proportionality of the constituent fluid flows is maintained substantially constant under such conditions it will be apparent that substantially no change is effected in the total heating value per unit volume or other qualities or characteristics of the mixture. When the volumetric rate of flow of the mixture has been increased to the required extent, the pressure switch 66 is operable automatically to interrupt the circuit of motor 65 whereby opening movement of valve 60ª is discontinued. Due to re-balancing of the bridge circuits included in the respective controls of valves 59ª, 58ª and 57ª opening movement of said valves will likewise be discontinued.

The operation of the control elements in the event of a decrease in the rate of demand for the mixture in conduit 61 will be more or less apparent from the foregoing description. Due to building up of pressure on the downstream side of valve 60ª under these conditions, the pressure drop across the latter will decrease below the value preselected therefor by the adjustment of spring 66ᵍ and the contactor 66ᵈ of switch 66 will be engaged with contact 66ᶠ. This completes a circuit for motor 65 to effect operation thereof in a direction the reverse of that aforedescribed,—said circuit extending from line L¹ by conductors 67 and 68 through contactor 66ᵈ and contact 66ᶠ, by conductor 94 through the other winding of motor 65, and by conductor 70 to line L².

Valve 60ª will thus be gradually moved toward closed position,—the rheostat contactors 71, 72 and 73 being simultaneously moved in a counter-clockwise direction to effect unbalancing of the bridge circuits respectively controlling operation of motors 64, 63 and 62. That is to say, the contactors 80ª, 87ª and 92ª of the polarized relays will be engaged with the contacts 80ᶜ, 87ᶜ and 92ᶜ, thus completing reverse circuits for said motors to effect gradual closing movement of valves 59ª, 58ª and 57ª.

When the volumetric rate of flow of the mixture has been reduced to the required value the pressure-switch contactor 66ᵈ will be moved to neutral position to interrupt the energizing circuit of motor 65, and the several Wheatstone bridge circuits will be re-balanced to effect interruption of operation of motors 64, 63, and 62.

In order to compensate for any increase or decrease in the total heating value per unit volume of the mixture in conduit 61 with respect to a desired or preselected value, say, 800 B. t. u. per cubic foot, I provide a calorimeter 45 which may be and preferably is of the character described in connection with the control system of Fig. 1, and the parts thereof are given like numerals of reference.

Thus, assuming even a very slight increase in the total heating value per unit volume of the mixture in conduit 61 with respect to the value preselected therefor by the setting of the calorimeter parts, the contactor 45ᵇ is moved into engagement with contact 45ᶜ, thus completing an energizing circuit for a motor 95 of the split-field reversing type; said circuit extending from line L¹ by conductors 96, 97 and 98 through contactor 45ᵇ and contact 45ᶜ, by conductor 99 through one field of said motor 95, and by conductors 100 and 101 to line L².

Motor 95 thus operates in a direction to effect, through gearing 95ª, 95ᵇ, movement (say, downward movement) of contactor 85 over resistor 85ª. This unbalances the Wheatstone bridge circuit including the polarized relay coil 87 in a sense to cause engagement of contactor 87ª with contact 87ᵇ, thus completing the aforedescribed energizing circuit of motor 63 which effects movement of valve 58ª toward closed position. It will be noted that valve 58ª under these conditions is operable independently of all of the other valves, and inasmuch as the adjustment is made in the volumetric rate of flow of the natural gas,—which has a very high total heating value per unit volume, it will be apparent that only a very small movement of valve 58ª will ordinarily be required to restore the desired total heating value per unit volume of the mixture.

Similarly in the event of a decrease in the total heating value per unit volume of the mixture, the calorimeter contactor 45ᵇ will be engaged temporarily with contact 45ᵈ to effect a reverse operation of motors 95 and 63 whereby valve 58ª is gradually moved toward closed position in an obvious manner to restore the desired quality of the mixture.

Ordinarily any such necessary change in the volumetric rate of flow of natural gas through conduit 58 will be of such small degree as to leave the volumetric rate of flow of the mixture in conduit 61 substantially unaffected. However, it is to be understood that the pressure-switch 66 and the control elements associated therewith are at all times adapted to function when necessary to effect substantially simultaneous adjustment of the several valves as aforedescribed.

In order to maintain the specific gravity of the mixture in conduit 61 at a substantially constant preselected value, say, .55, I may employ any well known or suitable specific gravity meter, such as that shown diagrammatically herein and designated in general by the numeral 102; said meter being supplied through piping 103 and 104 and pressure-regulating valve 105 with a continuous sample of the mixture from conduit 61. Meter 102 is provided with an indicator 102ª which carries a contactor 102ᵇ for cooperation with contacts 102ᶜ and 102ᵈ selectively.

Thus assuming an increase in the specific gravity of the mixture with respect to the value preselected therefor by the setting of meter 102, the contactor 102ᵇ will be engaged with contact 102ᶜ, thus completing an energizing circuit for the split-field reversible motor 106, which circuit may be traced from line L¹ by conductors 96 and 107 through contactor 102ᵇ and contact 102ᶜ, by conductor 108 through one field of said motor 106, and by conductors 109 and 101 to line L².

Motor 106 thus operates in a direction to effect, through gearing 106ª, 106ᵇ, movement (say, downward movement) of contactor 75 over resistor 75ª. This unbalances the Wheatstone bridge circuit including the polarized relay coil 80 in a sense to cause engagement of contactor 80ª with contact 80ᵇ, thus completing the aforedescribed energizing circuit of motor 64 which effects movement of valve 59ª toward closed position.

It will be noted that valve 59ª under these conditions is operable independently of all of the other valves, and inasmuch as the adjustment is made in the volumetric rate of flow of the water gas,—which has a relatively low total heating value per unit volume (as compared with the natural gas in conduit 58) and a relatively high specific gravity (as compared with the coke oven gas in conduit 60), it will be apparent that only a very small movement of valve 59ª will ordinarily be required to restore the desired value of the specific gravity of the mixture, whereas the change in the total heating value per unit volume of the mixture as an incident to such movement will be comparatively small.

Similarly in the event of a decrease in the specific gravity of the mixture, the meter contactor 102ᵇ will be engaged temporarily with contact 102ᵈ to effect a reverse operation of motors 106 and 64 whereby valve 59ª is gradually moved toward closed position in an obvious manner to restore the desired specific gravity of the mixture. Any necessary adjustment of valve 59ª individually in the manner just described to restore the preselected specific gravity of the mixture will thus have only a comparatively small effect upon the volumetric rate of flow of the mixture; but as aforestated the pressure-switch 66 and the control elements associated therewith will of course function when necessary to effect joint operation of the several valves, whereby the volumetric rate of flow of the mixture is maintained substantially constant.

In order to maintain at a substantially constant predetermined value the flame temperature and other desired flame characteristics of the mixture in conduit 61 I provide means for individually adjusting the position of valve 57ª whereby the volumetric rate of flow of the hydrogen is varied. Said means may comprise a Bunsen burner or jet burner of the character illustrated more or less diagrammatically at 110,—the same being supplied with a continuous sample of the mixture from conduit 61 through piping 111 and a manually adjustable valve 112.

The flame is designated by the numeral 113 and the inner cone of the flame is designated by the numeral 114. Arranged within the flame to be subjected to the temperature at the base of the cone 114 is the hot-junction of a thermocouple 115 of known form,—a similar thermocouple 116 having its hot-junction subjected to the temperature of the flame at the normal tip of the inner cone 114.

Thermo-couples 115 and 116 are connected in series with each other between the lower terminal of a galvanometer coil 117 and the adjustable contactor 118 associated with a resistor 118ª. The upper terminal of coil 117 and the left-hand terminal of resistor 118ª are connected in common by conductor 119 with one terminal of a battery 120,—the other terminal of said battery being connected through an adjustable rheostat 121 with the right-hand terminal of resistor 118ª. Rheostat 121 is adapted to be initially adjusted manually to control the value of current flowing from said battery, and the same may be thereafter adjusted at intervals to compensate for decrease in strength of the battery current as an incident to continued use thereof.

Contactor 118 is initially adjustable manually to effect neutral or intermediate positioning of the galvanometer needle, when the flame temperature, flame length, and other desired characteristics of the flame at burner 110 are of the desired or required value. Needle 117ª carries a contactor 117ᵇ which is cooperable with the stationary contacts 117ᶜ and 117ᵈ, selectively.

The arrangement of the parts just described is such that under normal conditions (that is, when the flame characteristics are of the desired values) the current generated in the thermocouples 115, 116 will be equal to and opposed to the battery current which tends to traverse the coil 117, wherefore the contactor 117ᵇ will be permitted to assume the intermediate or neutral position thereof illustrated.

On the other hand, if it be assumed that the flame temperature, for instance, increases with respect to the value preselected therefor, the value of current generated by thermo-couples 115, 116 will correspondingly increase to effect unbalancing of the circuit of coil 117 in a sense to cause engagement of contactor 117ᵇ with, say, contact 117ᶜ. This will complete a circuit for a split-field reversible motor 122 which, through gearing 122ª, 122ᵇ, is adapted to drive the contactor 90 associated with resistor 90ª. Said circuit may be traced from line L¹ by conductors 96 and 123 through contactor 117ᵇ and contact 117ᶜ, conductor 124 through one field of said motor 122, and by conductor 125 to line L².

Under these conditions it may be assumed that motor 122 is operated in a direction to effect downward movement of contactor 90 over resistor 90ª, thus unbalancing the bridge circuit including coil 92 in a sense to effect engagement of the polarized relay contactor 92ª with contact 92ᵇ. This completes a circuit for motor 62 to effect operation thereof in a direction to cause gradual closing movement of valve 57ª, thus reducing the volumetric rate of supply of hydrogen to correspondingly decrease the flame temperature and other related flame characteristics of the mixture supplied to burner 110.

When the preselected flame temperature has been restored contactor 117ᵇ will be moved automatically to neutral position, thus interrupting the aforedescribed circuit of motor 122, and due to balancing of the bridge circuit including coil 92 the contactor 92ª will be disengaged from contact 92ᵇ to interrupt the aforedescribed circuit of motor 62.

Assuming a decrease in the flame temperature with respect to the preselected value, the galvanometer 117 will be operated automatically to effect engagement of contactor 117ᵇ with contact 117ᵈ whereby a reverse circuit is provided for motor 122,—said circuit extending from line L¹ by conductors 96 and 123 through contactor 117ᵇ and contact 117ᵈ, by conductor 126 through the other winding of motor 122, and by conductor 125 to line L².

Accordingly contractor 90 will be moved upwardly over resistor 90ᵃ to unbalance, in the opposite sense from that aforedescribed, the bridge circuit including coil 92. The resulting engagement of contactor 92ᵃ with contact 92ᶜ will complete an obvious circuit for motor 62 whereby the latter is operated in a direction to effect gradual opening movement of valve 57ᵃ. When the desired value of flame temperature has been restored contactor 117ᵇ will again be permitted to assume its neutral position, with the results aforeindicated.

As will be understood by those skilled in the art, an increase or a decrease in the flame length at burner 110 will affect the position of the galvanometer contactor 117ᵇ in substantially the manner described in connection with an increase or decrease in flame temperature. Similarly any increase or decrease in the velocity of flame propagation will have a corresponding effect upon the value of the flame temperature or the flame length.

Any one or more of these flame characteristics may be very important in a given installation. Thus, if the gas mixture is to be used for heat-heating a furnace or a group of furnaces, a constant value of the flame temperature may be considered of primary importance,—whereas for a process of making electric lamps both the flame length and the flame temperature must be maintained substantially constant in order to obtain the best results.

The proportioning and mixing control system illustrated in Fig. 3 is in certain respects substantially like the systems illustrated in Figs. 1 and 2. In Fig. 3, however, I have shown fluid pressure operated valves which are normally operable automatically to maintain a substantially constant predetermined volumetric proportionality between the several constituent combustible fluid flows. Said fluid pressure operated valves are in general of the character disclosed in the Wünch Patent No. 1,558,529, dated October 27, 1925.

Thus I prefer to employ a branch conduit 127 through which a continuous stream of water gas, having a total heating value of about 500 B. t. u. per cubic foot and a specific gravity of about .65, is adapted to flow; a branch conduit 128 of like size through which natural gas, having a total heating value of about 1100 B. t. u. per cubic foot and a specific gravity of about .65, is adapted to flow; and a branch conduit 129 of relatively larger size through which coke oven gas, having a total heating value of about 500 B. t. u. per cubic foot and a specific gravity of about .35, is adapted to flow. Conduits 127, 128 and 129 jointly discharge into a relatively large conduit 130 in which the constituent gaseous fluids are mixed and through which the mixture is conveyed to a point or points of use or storage.

Conduits 127, 128, and 129 are respectively provided with adjustable valves 127ᵃ, 128ᵃ, and 129ᵃ,—said valves having like angular positions within said conduits and the same being operable jointly under given conditions through the medium of a rod or link 131. Rod 131 is provided at one end thereof with a piston 132 which is slidable within a closed cylinder 133.

Communicating with said cylinder 133 above and below piston 132 are a pair of small pipes 134 and 135 the outer ends of which are arranged very closely adjacent to each other and exposed at the inner surface of the end wall of a closed chamber or container 136. Pivotally mounted within chamber 136 is a pipe or nozzle 137 which is supplied through pipe 137ᵃ with oil or other liquid under pressure or compressed gas from any suitable source,—the pipe 138 communicating with the compressor or pump (not shown) to provide for withdrawal and re-use of any excess of fluid discharged through pipe 137.

The angular position of pipe 137 is subject to control by a rod or pin 139 which is carried by a diaphragm 140 enclosed within a housing 141,— a pipe 142 affording communication between the chamber at the upper side of diaphragm 140 and the conduit 129 at the downstream side of valve 129ᵃ, and a pipe 143 affording communication between the chamber at the lower side of diaphragm 140 and the conduit 129 at the upstream side of valve 129ᵃ. Pipe 137 is biased, as by compression spring 144, in a direction to oppose the force applied thereto by pin 139,—the degree of compression of said spring being adjustable at will in any well known manner to preselect the value of the pressure drop across valve 129ᵃ.

Thus assuming an increase in demand for the fluid mixture flowing in conduit 130, it will be apparent that the pressure of fluid on the downstream side of valve 129ᵃ will decrease, with a resulting increase in the value of the pressure drop across said valve. Accordingly the diaphragm 140 and rod 139 will be moved upwardly to displace nozzle 137 upwardly out of neutral or balanced relation to the adjacent ends of pipes 134, 135, so that a major portion or all of the fluid pressure transmitted by said nozzle will traverse pipe 134 and be applied to the upper end of piston 132. Consequently piston 132 will be moved downwardly within cylinder 133 to effect opening movement of valve 129ᵃ,—valves 128ᵃ and 127ᵃ being moved simultaneously in a like direction and to a corresponding degree, due to the mechanical interconnection provided by the aforementioned rod 131.

The volumetric rates of flow of the constituent combustible fluids are thus rapidly varied simultaneously while maintaining a predetermined volumetric proportionality therebetween, whereby the increased rate of demand for the fluid mixture is satisfied without any variation in the quality or total heating value per unit volume of the mixture.

When valves 129ᵃ, 128ᵃ, and 127ᵃ are thus opened to the required degree the preselected value of the pressure drop across valve 129ᵃ will be restored, and the diaphragm 140 will function automatically to permit nozzle 137 to return to the neutral position thereof illustrated, whereby the piston 132 and the valves 129ᵃ, 128ᵃ and 127ᵃ controlled thereby will be retained in the last adjusted positions thereof.

In order to maintain the values of the pressure drops across valves 128ᵃ and 127ᵃ equal to or definitely proportional to the value of the pressure drop across valve 129ᵃ, I provide in the respective conduits 128 and 127 the individually operable valves 128ᵇ and 127ᵇ,—the same being located in advance of the valves 128ᵃ and 127ᵃ, respectively. Means are provided for effecting adjustment of valve 128ᵇ automatically in response to variations in the differential value of the pressure drops across valves 129ª and 128ª; and means are also provided for effecting adjustment of valve 127ª automatically in response to variations in the differential value of the pressure drops across valves 129ª and 127ª.

The operating means for valve 128ᵇ comprises a rod 144 attached to said valve and to a piston 145 which is slidable within a closed cylinder 146,—pipes 147 and 148 communicating with said cylinder respectively above and below said piston and having the opposite ends thereof arranged closely adjacent to each other at the inner surface of an end wall of a chamber 149.
A nozzle 150 is pivotally supported within chamber 149,—and said nozzle is maintained in the intermediate or neutral position thereof through the opposing action of rods 151 and 152 so long as the pressure drops across valves 129ª and 128ª bear a predetermined ratio or relationship to each other.

As shown the upper surface of diaphragm 151ª is subjected through piping 153, 154 to the pressure at the downstream side of valve 129ª, and the lower surface of diaphragm 151ª is subjected through piping 155, 156 to the pressure at the upstream side of valve 129ª. Similarly the lower surface of diaphragm 152ª is subjected through piping 157 to the pressure at the downstream side of valve 128ª, and the upper surface of diaphragm 152ª is subjected through piping 158 to the pressure at the upstream side of valve 128ª.

For instance, if the pressure of fluid at the upstream side of valve 129ª should increase for any reason (thus increasing the value of the pressure drop across said valve) diaphragm 151ª and rod 151 will be moved upwardly to effect upward displacement of nozzle 150, thus providing for application of the major portion of the force of fluid from nozzle 150 to the upper end of piston 145 to effect opening movement of valve 128ᵇ.

This will of course increase the pressure of fluid at the upstream side of valve 128ª, and when the value of the pressure drop across the latter bears a predetermined ratio to the value of the pressure drop across valve 129ª, diaphragm 152ª and rod 152 will act automatically, under the influence of the increased pressure at the upstream side of valve 128ª, to return nozzle 150 to its intermediate or neutral position.

The means for predetermining the ratio of the pressure drops across valves 129ª and 128ª comprises essentially a disk or abutment 159 carried by a rod 159ª,—said disk being interposed between and slidable with respect to nozzle 150 and a rod or plate 159ᵇ which is pivoted at the end thereof diagonally opposed to the pivot of nozzle 150. Means are provided for automatically adjusting disk 159 in the manner and for the purpose hereinafter described.

The operating means for valve 127ᵇ comprises a rod 160 attached to said valve and to a piston 161 which is slidable within a closed cylinder 162,—pipes 163 and 164 communicating with said cylinder respectively above and below said piston and having the opposite ends thereof arranged closely adjacent to each other at the inner surface of an end wall of a chamber 165. A nozzle 166 is pivotally supported within chamber 165,—and said nozzle is maintained in the intermediate or neutral position thereof through the opposing action of rods 167 and 168 so long as the pressure drops across valves 129ª and 127ª bear a predetermined ratio to each other.
As shown the upper surface of diaphragm 167ª is subjected through piping 169, 154 to the pressure at the downstream side of valve 129ª, and the lower surface of diaphragm 167ª is subjected through piping 170, 156 to the pressure at the upstream side of valve 129ª. Similarly the lower surface of diaphragm 168ª is subjected through piping 171 to the pressure at the downstream side of valve 127ª, and the upper surface of diaphragm 168ª is subjected through piping 172 to the pressure at the upstream side of valve 127ª.

In the event of an increase in pressure at the upstream side of valve 129ª diaphragm 167ª and rod 167 will be moved upwardly to effect upward displacement of nozzle 166, thus effecting opening movement of valve 127ᵇ, as described in connection with valve 128ᵇ. The pressure of fluid at the upstream side of valve 127ª will be increased in this manner until the value of the pressure drop across the latter bears a predetermined ratio to the pressure drop across valve 129ª, whereupon nozzle 166 will be returned automatically to the neutral position illustrated.

An adjustable disk 173 is provided for preselecting the ratio of the pressure drop across valve 127ª with respect to the pressure drop across valve 129ª,—said disk being carried by a rod 173ª and interposed between and slidable with respect to nozzle 166 and a rod or plate 173ᵇ which is pivoted at the end thereof diagonally opposed to the pivot of nozzle 166. Means are provided for automatically adjusting disk 173 in the manner and for the purpose hereinafter described.

In order to maintain substantially constant the total heating value per unit volume of the mixture flowing in conduit 130 I provide means for varying the volumetric rate of flow of one of the constituent fluids with respect to other of the same. Moreover, for this purpose I prefer to vary individually the volumetric rate of flow of the natural gas through conduit 128, since because of its relatively high total heating value per unit volume only very small changes in the rate of flow thereof are required to compensate for such variations in the total heating value of the mixture flowing in conduit 130 as are met with in practice.

This arrangement has the further advantage of minimizing the variations in the volumetric rate of flow of the mixture through conduit 130 as an incident to compensation for variations in the total heating value per unit volume of the latter. Thus I have shown more or less diagrammatically a precision calorimeter 45 which may be and preferably is of the character described in connection with the systems of Figs. 1 and 2,—and the corresponding parts of said calorimeter have been given like numerals of reference.

Assuming an increase in the total heating value per unit volume of the mixture in conduit 130 with respect to the value preselected therefor by the setting of the calorimeter parts, the contactor 45ᵇ is moved into engagement with contact 45ᶜ, thus completing an energizing circuit for a motor 174 of the split-field reversing type; said circuit extending from line L¹ by conductors 175 and 176 through contactor 45ᵇ and contact 45ᶜ, by conductor 177 through one field of said motor 174, and by conductor 178 to line L².

Motor 174 thus operates in a direction to effect, through gearing 179 and rod 159ª, movement of disk 159 toward the left to permit automatic lowering of nozzle 150 from its neutral position. The major portion of the fluid force is therefore applied through pipe 148 to the lower face of piston 145 which is thereupon raised to effect closing movement of valve 128$^b$.

When the volumetric rate of flow of fluid through conduit 128 is decreased sufficiently to restore the preselected total heating value of the mixture in conduit 130 contactor 45$^b$ of the calorimeter will be moved to its neutral position thus interrupting operation of motor 174. Moreover, the aforementioned adjustment of disk 159 merely varies the ratio or proportionality of the value of the pressure drop across valve 128$^a$ with respect to the value of the pressure drop across valve 129$^a$. Accordingly after the required degree of closure of valve 128$^b$ the diaphragms 152$^a$ will act in a obvious manner to effect a return of nozzle 150 to its intermediate or neutral position.

In the event of a decrease in the total heating value per unit volume of the mixture flowing in conduit 130 the calorimeter contactor 45$^b$ will engage contact 45$^d$, thus completing a circuit to effect reverse operation of motor 174. Said circuit may be traced from line L$^1$ by conductors 175, 176 through contactor 45$^b$ and contact 45$^d$, by conductor 180 through the other field of said motor 174, and by conductor 178 to line L$^2$. Consequently disk 159 will be moved toward the right to raise nozzle 150, whereby the major portion of the fluid pressure from said nozzle is applied to the upper surface of piston 145 to effect the required degree of opening movement of valve 128$^b$,—the diaphragms 151$^a$, 152$^a$ thereafter acting automatically to effect neutral positioning of said nozzle 150.

Also in order to maintain the specific gravity of the mixture in conduit 130 at a substantially constant predetermined value, I prefer to provide means for individually varying the volumetric rate of flow of the water gas through conduit 127. Inasmuch as said water gas has a relatively high specific gravity (as compared with the specific gravity of the coke oven gas in conduit 129) only relatively slight variations in the volumetric rate of flow of said water gas will be necessary to compensate for such variations in specific gravity of said mixture in conduit 130 as will be met with in practice.

Moreover, due to the relatively low total heating value per unit volume of said water gas (as compared with the total heating value per unit volume of the natural gas in conduit 128), the aforementioned changes in the volumetric rate of flow of water gas will have comparatively little effect upon the total heating value per unit volume of the mixture in conduit 130.

Accordingly I provide a specific gravity meter 102 which may be of the character described in connection with Fig. 2,—the parts of which have been given like numerals of reference. Thus upon an increase in the specific gravity of the fluid in conduit 130 with respect to the value thereof preselected by the setting of meter 102, the contactor 102$^b$ will engage contact 102$^c$, thus completing a circuit for a motor 182 of the split-field reversing type,—said circuit extending from line L$^1$ by conductors 175, 183 through contactor 102$^b$ and contact 102$^c$, by conductor 184 through one field of motor 182, and by conductors 185 and 178 to line L$^2$.

Motor 182 thereupon operates, through gearing 186, 187, to effect movement of disk 173 toward the left, with consequent lowering of nozzle 166 to effect upward movement of piston 161, whereby valve 127$^b$ is moved toward closed position. After attainment of the adjusted ratio of the pressure drop across valve 127$^a$ with respect to the value of the pressure drop across valve 129$^a$, nozzle 166 is moved automatically to its intermediate or neutral position.

Similarly upon a decrease in the specific gravity of the fluid flowing in conduit 130, the meter contactor 102$^b$ will engage contact 102$^d$, thus completing a reverse circuit for motor 182,—which circuit may be traced from line L$^1$ by conductors 175, 183 through contactor 102$^b$ and contact 102$^d$, by conductor 188 through the other winding of motor 182, and by conductors 185, 178 to line L$^2$.

Motor 182 will therefore operate in a direction to effect movement of disk 173 toward the right, with consequent raising of nozzle 166 and lowering of piston 161 to effect opening movement of valve 127$^b$. When the new ratio of the pressure drop across valve 127$^a$ with respect to the pressure drop across valve 129$^a$ has been attained, nozzle 166 will be moved automatically to neutral position through the action of diaphragms 167$^a$, 168$^a$.

From the foregoing description it will be apparent to those skilled in the art that the system of Fig. 1 may be modified by providing a third branch conduit through which water gas, having a relatively high specific gravity, is adapted to flow,—the volumetric rate of flow thereof being controlled jointly with the rates of flow of natural gas and coke oven gas in accordance with and to compensate for variations in demand for the fluid mixture; and the volumetric rate of flow of the water gas being subject to individual control through the medium of a specific gravity meter.

Similarly the systems of Figs. 1 and 3 may be modified in accordance with my invention by providing a conduit through which a gas, such as hydrogen, is adapted to flow, the volumetric rate of flow of hydrogen being normally maintained proportional to the volumetric rates of flow of the other constituent fluids, under conditions of variation in the rate of demand for the mixture, and the volumetric rate of flow of the hydrogen being individually varied to compensate for variations in flame temperature, flame length, or velocity of flame propagation of the fluid mixture.

As indicated in the several figures of the drawings, the size and arrangement of the reduction gearing interposed in the control of the volumetric rate of flow of the natural gas, or other gas of relatively high total heating value per unit volume, is such that said volumetric rate of flow is adjusted quite rapidly to provide for maintenance of the correct or preselected total heating value per unit volume of the mixed gas, which value should be maintained to within one-half of one per cent accuracy. On the other hand, the adjustment of the volumetric rate of flow of the water gas (or coke oven gas) may be effected quite slowly, since the permissible range of variation in specific gravity of the mixture may be relatively wide, say, between .55 and .65. In like manner the adjustment of the volumetric rate of flow of hydrogen (when employed) may be effected quite slowly, since variation of the gas properties which tend to affect the flame characteristics of the gas mixture takes place quite slowly.

While I have herein described my invention as applied to the proportioning of combustible gaseous fluids, it will be apparent to those skilled in the art that the invention is readily adaptable for the proportioning of combustible fluids other than gases.

What I claim as new and desire to secure by Letters Patent is:

1. The method of maintaining substantially constant the values of a plurality of different characteristics, such as the total heating value per unit volume and the specific gravity of a mixture of combustible gaseous fluids, which comprises effecting a multiplicity of initially volumetrically proportioned flows of fluids, combining said flows to provide the mixture, separately and simultaneously ascertaining the instantaneous values of the aforementioned characteristics of said mixture, and individually varying the relative volumetric rates of the respective flows in accordance with and to compensate for variations in said instantaneous values of said characteristics with respect to the values preselected therefor.

2. The method of maintaining substantially constant the values of a plurality of different characteristics, such as the total heating value per unit volume and the specific gravity, of a mixture of combustible gaseous fluids, which comprises effecting a multiplicity of initially volumetrically proportioned flows of fluids, combining said flows to provide the mixture, separately and simultaneously ascertaining the instantaneous values of the aforementioned characteristics of said mixture, individually varying the relative volumetric rates of the respective flows in accordance with and to compensate for variations in said instantaneous values of said characteristics with respect to the values preselected therefor, and substantially simultaneously varying the volumetric rates of all of said flows while maintaining the required volumetric proportionality therebetween, to thereby compensate for variations in the degree of pressure of the mixture as determined by the rate of demand therefor.

3. The method which comprises effecting a plurality of flows of gaseous fluids which substantially differ from each other in character, initially adjusting the volumetric rates of flow of said fluids and mixing the same to provide a mixture having the desired total heating value per unit volume and the desired specific gravity, varying the volumetric rate of flow of one of said fluids in response to variations in the degree of pressure of the mixture as determined by the rate of demand therefor, thereafter gradually varying the volumetric rate of flow of another of said fluids in response to variations in the volumetric rate of flow of said first mentioned fluid to normally maintain a substantially constant predetermined proportionality between said volumetric rates of flow of said fluids, ascertaining the instantaneous value of the specific gravity and the instantaneous total heating value per unit volume of the mixture, and independently varying the volumetric rates of flow of a plurality of said fluids in accordance with and to compensate for variations in said instantaneous values with respect to the preselected values.

4. The method of maintaining of substantially constant predetermined values a plurality of different characteristics, such as total heating value per unit volume and specific gravity, of a mixture of combustible gaseous fluids, which comprises effecting a plurality of individual flows of fluids of unlike quality, combining said flows to provide the mixture, initially adjusting the relative volumetric rates of said individual flows to provide said predetermined values of the aforementioned characteristics of the mixture, substantially simultaneously varying the volumetric rates of flow of all of said constituents while maintaining a predetermined proportionality therebetween to compensate for variations in degree of pressure of the mixture as determined by the rate of demand therefor, and supplementally and individually varying the volumetric rates of a plurality of said individual flows with respect to other of the same in accordance with and to compensate for variations in the values of the aforementioned characteristics of said mixture with respect to said predetermined values.

5. The method which comprises effecting two individual flows of gaseous fluids of substantially equal total heating value per unit volume, the specific gravity of one of said fluids being relatively high and the specific gravity of the other fluid being relatively low, effecting a third individual flow of gaseous fluid of relatively higher quality or total heating value per unit volume than said fluids first mentioned, the specific gravity of said third fluid being substantially equal to the relatively high value aforementioned, proportioning and mixing said individual flows to provide a mixture having the desired quality or total heating value per unit volume and the desired specific gravity, substantially simultaneously varying the volumetric rates of said three flows in accordance with and to compensate for variations in the degree of pressure of the mixture as determined by the rate of demand therefor, individually varying the volumetric rate of flow of said third fluid in accordance with and to compensate for variations in the quality or total heating value per unit volume of the mixture with respect to a predetermined value, and individually varying the volumetric rate of flow of one of said first mentioned fluids in accordance with and to compensate for variations in the specific gravity of the mixture with respect to a predetermined value.

6. The method which comprises effecting two individual flows of gaseous fluids of substantially equal total heating value per unit volume, the specific gravity of one of said fluids being relatively high and the specific gravity of the other fluid being relatively low, effecting a third individual flow of gaseous fluid of relatively higher quality or total heating value per unit volume, the specific gravity of said third fluid being substantially equal to the relatively high value aforementioned, effecting a fourth individual flow of gaseous fluid having predetermined flame characteristics when burned, proportioning and mixing said individual flows to provide a mixture having the desired total heating value per unit volume, the desired specific gravity and the desired burning qualities, substantially simultaneously and proportionally varying the volumetric rates of flow of all of said fluids in accordance with and to compensate for variations in the degree of pressure of the mixture as determined by the rate of demand therefor, individually varying the volumetric rate of flow of said fourth fluid in accordance with and to compensate for variations in the values of the burning qualities of the mixture with respect to certain predetermined values, individually varying the volumetric rate of flow of said third fluid in accordance with and to compensate for variations in the quality or total heating value per unit volume of the mixture with respect to a predetermined value, and individually varying the volumetric rate of flow of one of said first mentioned fluids in accordance with and to compensate for variations in the specific gravity of the mixture with respect to a predetermined value.

7. The method which comprises effecting two individual flows of gaseous fluids of substantially equal total heating value per unit volume, the specific gravity of one of said fluids being relatively high and the specific gravity of the other fluid being relatively low, effecting a third flow of gaseous fluid of relatively higher total heating value per unit volume, the specific gravity of said third fluid being substantially equal to the relatively high value aforementioned, effecting a fourth individual flow of gaseous fluid having predetermined flame characteristics when burned, proportioning and mixing said individual flows to provide a mixture having the desired total heating value per unit volume, the desired specific gravity and the desired burning qualities, substantially simultaneously and proportionally varying the volumetric rates of flow of all of said fluids in acordance with and to compensate for variations in the degree of pressure of the mixture as determined by the rate of demand therefor, individually and relatively slowly varying the volumetric rate of flow of said fourth fluid in accordance with and to compensate for variations in the values of the burning qualities of the mixture with respect to the valves preselected therefor, individually and relatively rapidly varying the volumetric rate of flow of said third fluid in accordance with and to compensate for variations in the total heating value per unit volume of the mixture with respect to a predetermined value, and individually and relatively slowly varying the volumetric rate of flow of the first mentioned fluid of relatively high specific gravity in accordance with and to compensate for variations in the specific gravity of the mixture with respect to a predetermined value.

8. The method of proportioning and mixing a multiplicity of combustible gases to provide a combustible gaseous mixture whose combustion characteristics are of substantially constant predetermined values, which consists in effecting initially volumetrically proportioned flows of said gases, effecting a mixture of said flows, automatically varying the volumetric rate of flow of one of said gases in accordance with variations in the degree of pressure of the mixture as determined by rate of demand therefor, thereafter gradually varying the volumetric rates of flow of the other gases to thereby maintain a substantially constant predetermined proportionality between the latter and said first mentioned gas, simultaneously and individually ascertaining the instantaneous total heating value per unit volume, the specific gravity, and the flame characteristics or said mixture, and correspondingly and respectively varying the volumetric rates of flow of said other gases, whereby the values of said characteristics of said mixture are maintained substantially constant.

9. In a gas mixing and proportioning control system, in combination, a multiplicity of branch conduits through which combustible fluids having substantially different combustion characteristics are respectively adapted to flow, a main conduit into which said branch conduits are adapted to discharge to provide a combustible mixture, a valve in each of said branch conduits, said valves being initially adjusted to so proportion said flows volumetrically as to provide a mixture whose combustion characteristics are of predetermined values respectively, means responsive to variations in the degree of pressure of said mixture as determined by the rate of demand therefor for effecting proportional adjustment of all of said valves whereby the volumetric rate of flow of the mixture is increased or decreased in accordance with said variations in the degree of pressure thereof, means for continuously ascertaining the value of a given combustion characteristic of said mixture with respect to a predetermined value, means controlled by said last mentioned means for effecting adjustment of one of said valves individually whereby the value of said combustion characteristic in said mixture is maintained substantially constant, means for continuously ascertaining the value of another given combustion characteristic of said mixture with respect to a predetermined value, and means controlled by said last mentioned means for effecting adjustment of another of said valves individually whereby the value of said last mentioned combustion characteristic in said composite flow is likewise maintained substantially constant.

10. In a device of the character described, in combination, a plurality of branch conduits through which combustible fluids having substantially different combustion characteristics are respectively adapted to flow, a main conduit into which said branch conduits are adapted to discharge and through which the combustible mixture is adapted to flow, a valve in each of said branch conduits, a reversible electric driving motor for each of said valves, a switch responsive to pressure conditions within said main conduit, said switch being adapted to effect operation of one of said motors in a direction to effect closing movement of its associated valve upon a predetermined increase in pressure in said main conduit and to effect operation of said last mentioned motor in a direction to effect opening movement of said valve upon a predetermined decrease in pressure in said main conduit, a contactor movable with said last mentioned valve and a resistance with which said contactor is adapted to coact, a contactor movable with the other of said valves and a resistance with which said last mentioned contactor is adapted to coact, a polarized relay having a coil, said resistances and said contactors and coil being connected in the form of a Wheatstone bridge with respect to a suitable source of energy supply, a contactor associated with said relay coil, a pair of contacts to be selectively engaged by said contactor upon unbalancing of said bridge circuit in opposite senses respectively, said contactor and said contacts being adapted to control the driving motor of the other of said valves to thereby normally and automatically maintain a predetermined volumetric proportionality between said constituent flows, a calorimeter adapted to continuously ascertain the instantaneous total heating value per unit volume of the mixture flowing in said main conduit, a reversible electric motor controlled by said calorimeter, a contactor driven by said motor, and a third resistance with which said contactor is adapted to coact, said last mentioned contactor and said resistance being associated with said Wheatstone bridge circuit to provide for unbalancing of the latter in a sense and to a degree depending upon the variation in the total heating value per unit volume of said mixture with respect to a predetermined value, whereby said second mentioned valve is operated independently of the first mentioned valve to maintain said total heating value per unit volume substantially constant.

11. In apparatus for maintaining substantially constant the total heating value per unit volume, the specific gravity and the burning characteristics of a composite flow of combustible fluids, the combination with a multiplicity of branch conduits through which combustible fluids having substantially different combustion characteristics are adapted to flow, a main conduit into which said branch conduits are adapted to discharge and through which the mixture of said fluids is adapted to flow, a valve in each of said branch conduits, said valves being initially adjusted to provide in said main conduit a mixture having a predetermined total heating value per unit volume, a predetermined specific gravity and predetermined burning characteristics, pressure means responsive to variations in the degree of pressure of said mixture as determined by the rate of demand therefor to automatically effect adjustment of one of said valves, means operatively associated with said last mentioned valve to effect substantially simultaneous and proportional adjustment of all of the other valves, whereby the volumetric proportionality of said fluids is maintained substantially constant, calorimetric means for continuously ascertaining the instantaneous total heating value per unit volume of said mixture, means controlled by said calorimetric means and responsive to variations in said value to effect adjustment of one of said other valves individually whereby the total heating value per unit volume of said mixture is maintained substantially constant, means for continuously ascertaining the instantaneous value of the specific gravity of said mixture, means controlled by said last mentioned means and responsive to variations in said value to effect adjustment of another of said valves individually whereby the specific gravity of said mixture is maintained substantially constant, means for continuously ascertaining the instantaneous value of the burning characteristics of said mixture, and means controlled by said last mentioned means and responsive to variations in said value to effect adjustment of still another of said valves individually whereby the value of the burning characteristics of said mixture is maintained substantially constant.

12. In a gas mixing and proportioning control system, in combination, a multiplicity of branch conduits through which combustible fluids having substantially different combustion characteristics are respectively adapted to flow, a main conduit into which said branch conduits are adapted to discharge and through which the mixture is adapted to flow, a power operated valve in each of said branch conduits, means responsive to variations in pressure of fluid in said main conduit as an incident to variations in demand for the mixture to automatically effect adjustment of one of said valves, associated means operable automatically to effect a follow-up operation of another of said valves whereby the volumetric rates of flow of said constituents are normally maintained substantially proportional to each other, means for continuously ascertaining the instantaneous total heating value per unit volume of said mixture, and means responsive to variations in said value with respect to a predetermined value to effect corresponding operation of said second mentioned valve individually whereby the total heating value per unit volume of said mixture is maintained substantially constant.

13. In a control system of the character described, in combination, branch conduits through which hydrogen, natural gas, water gas and coke oven gas are respectively adapted to flow, a main conduit into which said branch conduits are adapted to discharge and through which the resulting gaseous mixture is adapted to flow, means responsive to variations in the degree of pressure of the mixture as determined by the rate of demand therefor to jointly and proportionally vary the volumetric rates of flow through said branch conduits, means responsive to variations in the burning characteristics of said mixture to individually vary the volumetric rate of flow of hydrogen whereby said burning characteristics are maintained of substantially constant value, means responsive to variations in the total heating value per unit volume of said mixture to individually vary the volumetric rate of flow of natural gas whereby said total heating value per unit volume is maintained substantially constant, and means responsive to variations in the specific gravity of said mixture to individually vary the volumetric rate of flow of water gas whereby said specific gravity is maintained substantially constant.

14. In a control system of the character described, in combination, branch conduits through which hydrogen, natural gas, water gas and coke oven gas are respectively adapted to flow, a main conduit into which said branch conduits are adapted to discharge and through which the resulting gaseous mixture is adapted to flow, means including a valve in each of said branch conduits, said valves being initially adjusted to provide in said mixture predetermined burning characteristics, a predetermined total heating value per unit volume and a predetermined specific gravity, means responsive to variations in pressure of said mixture as an incident to variations in demand therefor to automatically effect adjustment of the valve in said branch conduit through which said coke oven gas is adapted to flow, associated means to automatically effect a corresponding adjustment of each of the other valves whereby the flows through all of said branch conduits are normally maintained substantially proportional to each other under conditions of variation in the rate of demand for the mixture, means for burning a continuous sample of the mixture to ascertain the instantaneous value of the flame temperature, associated means controlled by said last mentioned means for individually varying the volumetric rate of flow of hydrogen to compensate for variations in said value with respect to a predetermined value, means including a calorimeter for burning a continuous sample of the mixture to ascertain the total heating value per unit volume thereof, associated means controlled by said calorimeter for individually varying the volumetric rate of flow of natural gas to compensate for variations in said value with respect to a predetermined value, means including a specific gravity meter for continuously ascertaining the specific gravity of said mixture, and associated means controlled by said specific gravity meter for individually varying the volumetric rate of flow of water gas to compensate for variations in the value of said specific gravity with respect to a predetermined value.

15. The method of maintaining substantially constant the values of a plurality of different characteristics, such as the total heating value per unit volume and the volumetric rate, of a flowing mixture of combustible gaseous fluids, which comprises effecting a multiplicity of initially volumetrically proportioned flows of the fluids, combining said fluids to provide said flowing mixture, jointly and proportionally varying the volumetric rates of flow of said fluids in accordance with and to compensate for variations in the degree of pressure of the mixture as determined by the rate of demand therefor, and individually varying the volumetric rate of flow of one of said fluids in accordance with and to compensate for variations in the instantaneous total heating value per unit volume of said mixture.

EDWIN X. SCHMIDT.

CERTIFICATE OF CORRECTION.

Patent No. 2,072,384.  March 2, 1937.

EDWIN X. SCHMIDT.

It is hereby certified that error appears in the printed specification of the above numbered patent requiring correction as follows: Page 2, second column, line 17, for the word "movement" read movements; page 6, second column, line 6, for "glavanometer" read galvanometer; page 7, first column, line 8, for "contractor" read contactor; page 9, first column, line 15, for "a" before obvious" read an; page 11, first column, line 19, claim 7, for "predtermined" read predetermined; and line 33, same claim, for "valves" read values; line 63, claim 8, for "or" read of; and that the said Letters Patent should be read with these corrections therein that the same may conform to the record of the case in the Patent Office.

Signed and sealed this 12th day of October, A. D. 1937.

(Seal)

Henry Van Arsdale.
Acting Commissioner of Patents.